United States Patent [19]

Chandler et al.

[11] Patent Number: 4,621,017
[45] Date of Patent: Nov. 4, 1986

[54] CORROSION AND WEAR RESISTANT GRAPHITE MATERIAL AND METHOD OF MANUFACTURE

[75] Inventors: Richard C. Chandler, Bedford Hts.; Lutfi H. Amra, Cleveland Hts., both of Ohio

[73] Assignee: Kennecott Corporation, Cleveland, Ohio

[21] Appl. No.: 586,297

[22] Filed: Mar. 5, 1984

Related U.S. Application Data

[62] Division of Ser. No. 368,700, Apr. 15, 1982.

[51] Int. Cl.⁴ .......................... B32B 5/16; B32B 9/00
[52] U.S. Cl. .................................... 428/328; 427/113; 427/249; 427/255.4; 427/294; 427/374.1; 427/419.7; 427/430.1; 428/408; 428/698
[58] Field of Search ............... 427/249, 294, 228, 350, 427/113, 255.2, 376.1, 255.4, 374.1, 376.2, 369, 419.1, 419.7, 431, 430.1, DIG. 11; 428/408, 323, 689, 446, 698, 699, 328

[56] References Cited

U.S. PATENT DOCUMENTS

| | | | |
|---|---|---|---|
| 1,948,382 | 2/1934 | Johnson | 201/75 |
| 2,528,210 | 10/1950 | Steward | 222/385 |
| 2,685,539 | 8/1954 | Woodburn et al. | 428/408 |
| 2,685,540 | 8/1954 | Woodburn et al. | 117/169 |
| 2,906,632 | 9/1959 | Nickerson | . |
| 3,250,322 | 5/1966 | McCrary et al. | 165/133 |
| 3,342,627 | 9/1967 | Paxton et al. | 427/113 |
| 3,510,347 | 5/1970 | Strater | 117/169 |
| 3,553,010 | 1/1971 | Rubisch | 428/216 |
| 3,925,577 | 12/1975 | Fatzer et al. | 428/446 |
| 4,104,417 | 8/1978 | Sara | 427/37 |
| 4,465,777 | 8/1984 | Shuford | 427/419.7 |

FOREIGN PATENT DOCUMENTS 1388539 4/1964 France .

OTHER PUBLICATIONS

Bullock, R. E., 1980, Design of Coated Fuel Particles for a Hybrid Fusion-Fission System.

Primary Examiner—Sadie L. Childs
Attorney, Agent, or Firm—R. Lawrence Sahr

[57] ABSTRACT

The invention provides a composite carbon or graphite having desirable properties such as corrosion and wear resistance. The invention combines a graphite substrate with a protective porous zone of silicon carbide. The whole body of graphite plus silicon carbide then is infiltrated with aluminum phosphate. An adhered barrier of silicon carbide, ranging in thickness between 0.015 and 0.050 inch thick is integrated with a graphite stratum to form a very hard surface, resistant to mechanical and chemical wear. The silicon carbide barrier is closely compatible to the graphite substrate, in resistance to thermal shock and in qualities of thermal expansion. In order to improve oxidation resistance further, a new composition was formed by infiltrating aluminum phosphate through the silicon carbide into the graphite to form a single body of composite graphite.

11 Claims, 13 Drawing Figures

(700X)

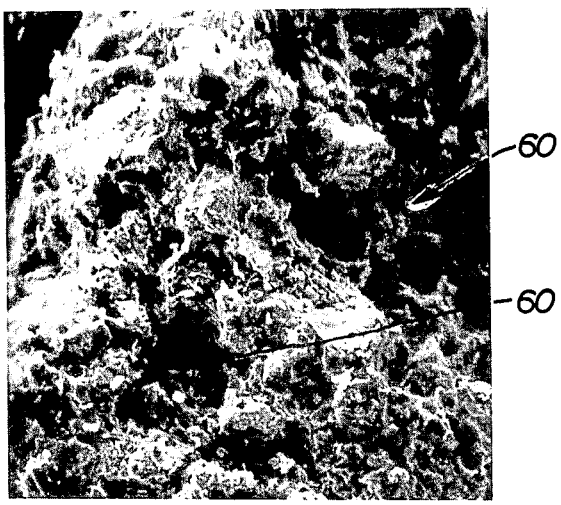
FIG. 5 (100X)
FIG. 6 (700X)
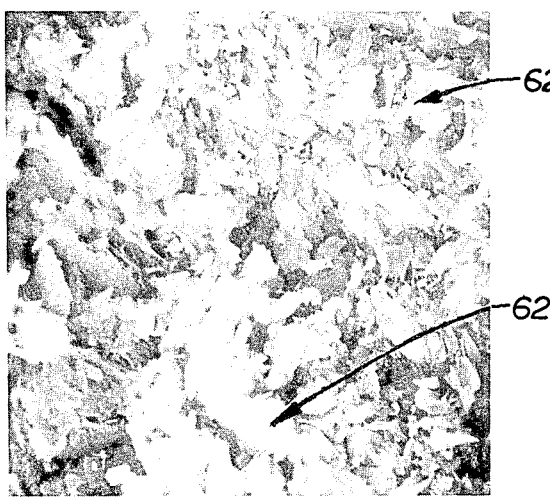
FIG. 7 (1000X)
FIG. 8 (700X)
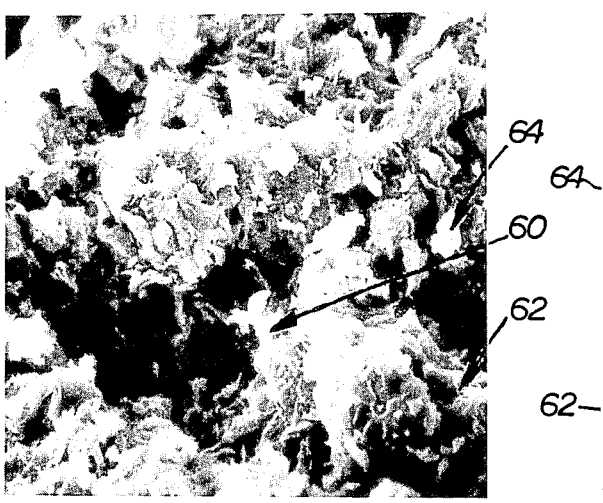
FIG. 9 (700X)
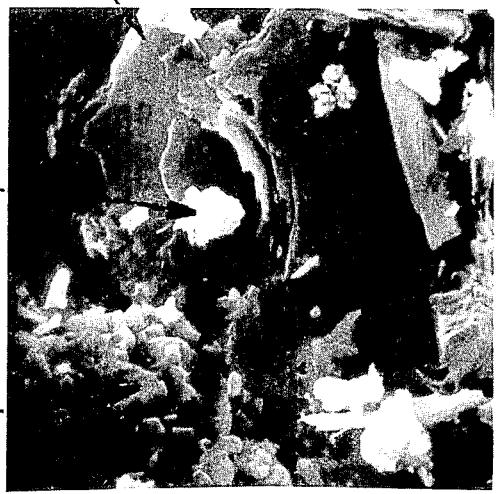
FIG. 10 (1800X)

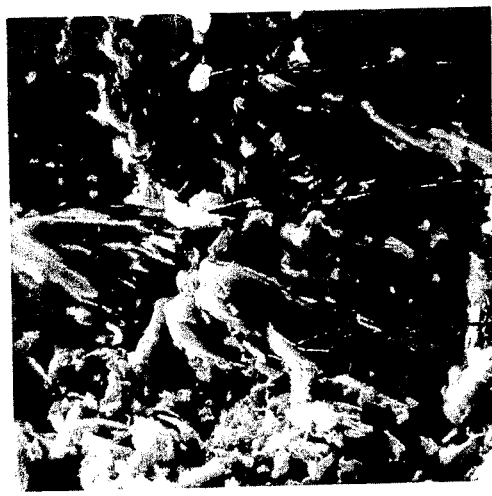
FIG. 11 (700X)
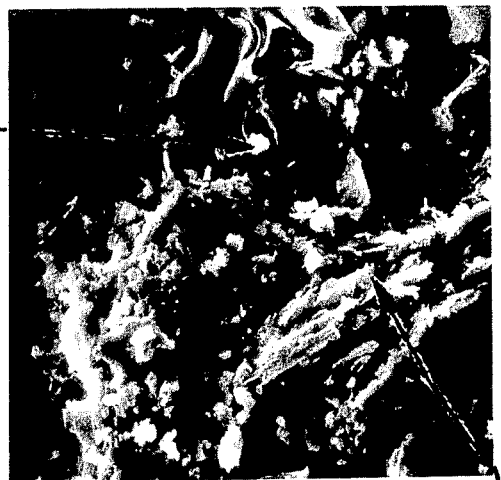
FIG. 12 (700X)
FIG. 13 (700X)

CORROSION AND WEAR RESISTANT GRAPHITE MATERIAL AND METHOD OF MANUFACTURE

CROSS REFERENCE TO RELATED APPLICATION

This is a divisional of application Ser. No. 368,700, filed Apr. 15, 1982.

MOLTEN METAL TRANSFER DEVICE, patent application Ser. No. 368,703, filed concurrently by R. E. Gilbert et al, U.S. Pat. No. 4,474,315 here the "Shot Pump Patent."

BACKGROUND OF THE INVENTION

1. Field of the Invention

The invention relates to the production of carbon articles used in high temperature applications and, more specifically, to a technique for treating carbon articles to minimize corrosion and wear upon contact with high temperature fluids.

2. Description of the Prior Art

Carbons and graphites have been used in elevated temperature applications due to the exceptional properties that these materials exhibit at high temperature. For convenience, these carbonaceous materials hereafter will be referred to collectively as "graphite." The structural strength of articles made from graphite can be maintained through a broad range of elevated temperatures. The terms "high temperature" and "elevated temperature" as used herein refer to temperatures generally within a range of approximately 500°–1000° C. The strength of articles made from graphite actually increases as temperature is elevated. Articles made from graphite have been used in many high temperature applications such as electrodes (both for gouging operations and for electric arc furnaces), furnace liners, and other parts which require refractory characteristics such as crucibles for molten metal, molten metal filters, and molten metal pumps. More recently, graphite articles have been used in a broad range of jet engine and aeronautical applications such as high temperature seals.

A problem with the use of graphite in elevated temperature applications is that graphite, when in contact with air, is susceptible to corrosion as a result of high temperature oxidation. The terms "corrosion" and "oxidation" will be used interchangeably hereinafter to indicate a chemical change in the graphite wherein the carbon atoms are combined with oxygen. Corrosion causes graphite articles to deteriorate rapidly, thus requiring relatively frequent replacement with the attendant high cost thereof. In addition to corrosion problems, graphite articles brought into contact with moving molten metals or other high temperature fluids are subject to wear caused by the movement of the fluids over the surface of the articles. The abrasive action of the high temperature fluids likewise causes relatively frequent replacement of the articles which is, of course, also associated with high costs.

Many attempts have been made to diminish or correct the problems of corrosion and wear of graphite articles in high temperature applications. One known approach to the oxidation and erosion problems has employed a thin coating of silicon carbide (SiC) or silicon oxicarbide (SiOC) formed on the surface of the graphite articles. Silicon carbide and silicon oxicarbide coatings are noted for their high abrasion-resistant characteristics.

A chemical vapor deposition technique for silicon carbide is described in E. L. Kern, et al, *Fabricating SiC Parts By Chemical Vapor Deposition*, Solid State Research, Dow Corning Corporation, Hemlock, Mich. (approximately 1968), the disclosure of which is incorporated herein by reference. In the referenced chemical vapor deposition technique of Dow Corning, after heating the graphite article, silicon carbide is deposited on the surface of the article by contact of gaseous chemicals such as alkylchlorosilanes and hydrogen. The combined gases decompose on the surface of the article and react with the surface layer of carbon atoms to provide a high quality silicon carbide layer integrally formed with the surface of the article itself. Temperatures on the order of 1150°–1250° C. have been found suitable for forming layers of silicon carbide.

Unfortunately, the experience with graphite articles coated in the foregoing fashion has been that the coating tends to flake off the base material, thus exposing the base material to oxidation. Furthermore, the process of coating by itself changes the shape of the article, requiring expensive grinding of the very hard coating to maintain tolerance. Furthermore, the chemical vapor deposition technique described by Kern requires the use of isotropic graphite in molded shape, which is several times as expensive as extruded graphite.

In order to avoid cracking of the coating when subjected to thermal shock, it has been suggested that the correct approach is to first coat the graphite article with a thin layer of either silicon carbide or silicon oxicarbide followed by coating the article with a glaze. The parameters for the glaze have been that (a) it should have a coefficient of thermal expansion as close to that of the graphite article as possible, (b) that none of the constituents of the glaze should react with carbon, silicon carbide, or silicon oxicarbide in the temperature range for which the article is to be used, and (c) that the glaze should adhere well to the coating of either silicon carbide or silicon oxicarbide. Glazes that have been suggested are combinations of fluorides of the alkali or alkaline earth metals, either alone or in further combination with oxides of boron, silicon, aluminum, phosphorus, magnesium, calcium or zirconium. The intended purpose of the glaze is to mechanically fill in the pores which occur in both the graphite substrate and in the silicon carbide or silicon oxicarbide coating. A problem inherent with this sort of a glaze is that, although it might be sufficient to prevent oxidation at elevated temperatures, it does not deal with the wear problem. Also, it adds the concern of having a coating on the exterior of the graphite article which may be reactive with high temperature fluids.

An especially effective technique has been discovered for forming a coating of silicon carbide on the surface of a graphite crucible in order to enable pure silicon to be melted in the crucible for contamination-free crystallization. Although it is believed that this technique has not been used in combination with a protective glaze to eliminate the cracking problem, it nevertheless should be effective in reducing problems associated with thermal shock in silicon carbide coatings. French Pat. No. 1,388,539 discloses a crucible composed of graphite wherein the inner surface of the crucible is transformed into silicon carbide by way of a multi-step process. The crucible first is elevated in temperature to 1300° C. for a short period of time. Then hydrogen and trichlorosilicane gases are introduced into the crucible. This causes the formation of silicon on the surface of the graphite. Next, the temperature is elevated to 1420° C. where the silicon begins to melt. Then the temperature is lowered to 1300° C. and maintained there for a short period of time while the hydrogen and trichlorosilicane gases are continued to be circulated through the chamber. Again the temperature is raised to 1420° C., causing the silicon to remelt. The temperature then is lowered again to 1300° C. Then, again, the temperature is increased for a third time to 1420° C. All of this causes a uniform melting of the silicon deposit on the graphite. Finally, the temperature of the crucible is raised slightly above 2000° C., bringing the graphite up to the white heat stage, where it is held for about one minute. At this point, the silicon reacts with the graphite substrate to form a zone of silicon carbide. Since the crucible has been maintained continuously at relatively uniform elevated temperatures, there is reduced concern with cracking or flaking of the silicon carbide surface caused by thermal shock. Nevertheless, in spite of the relatively high quality silicon carbide resulting from the use of this technique, it still does not completely address the problem of oxidation of the graphite substrate. Also, the surface tolerances of the finished product render it largely unsuitable for use in environments employing closely mating parts.

One approach to the oxidation problem calls for the application of aluminum phosphate ($AlPO_4$) compounds or magnesium phosphate ($Mg_3(PO_4)_2$) compounds to graphite bodies to mechanically fill, or impregnate, the pores, thus reducing the propensity of the graphite to oxidize at elevated temperatures. For example, several formulations have been suggested for developing aluminum phosphate compounds which can act as impregnants; however, the molar ratio of aluminum oxide ($Al_2O_3$) to phosphorus oxide ($P_2O_5$) in the aluminum phosphate compounds must be between about 0.2:1 and 0.8:1. A distinction has been made between aluminum phosphate and aluminum phosphate dissolved in acidic solution because aluminum phosphate, as such, actually exerts a catalytic effect on the oxidation rate of graphite and other carbonaceous materials at temperatures in excess of 500° C.

Yet another anti-oxidation technique carries on the concept of using aluminum phosphate compounds, as distinguished from pure aluminum phosphate, in coating graphite articles. This technique employs a compound called "calcium aluminum oxyphosphate." The compound is formed by the interaction of calcium, aluminum, and oxyphosphate-containing compounds which react to form a compound having calcium oxide (CaO), aluminum oxide ($Al_2O_3$), and phosphorus oxide ($P_2O_5$). The calcium aluminum oxyphosphate compound is brushed or sprayed onto the surface of the graphite article or the graphite article is soaked in the compound.

The foregoing techniques, which employ various acidic solutions of aluminum phosphate, as distinguished from only aluminum phosphate, all have served to increase to one degree or another the oxidation resistance of graphite articles at elevated temperatures. However, the increase has not been sufficient to significantly alter the economics involved with frequent replacements of these graphite articles. Importantly, none of the foregoing anti-oxidizing techniques has adequately dealt with the erosion problem caused by high temperature fluids coming into contact with the graphite articles.

A more recent approach is directed toward diminishing or eliminating the detrimental effects of oxidation of graphite articles; as well as to providing good erosion resistance. This more recent approach employs an aluminum coating chemically bonded to a graphite article by means of a metal carbide interface, the metal selected from the group consisting of tantalum, titanium and hafnium. The interfacial layer of metal carbide is synthesized in situ in the presence of aluminum, thereby effecting a strong bond between the aluminum and the carbon via the metal carbide interface. The advantage of this technique is that the aluminum is chemically bonded to the carbon, rather than mechanically. Accordingly, the graphite articles thus coated are useful in applications such as furnace electrodes where graphite articles having coatings of mechanically coated aluminum would not be suitable. Nevertheless, the principal uses of the technique are for bonding graphite articles together or for bonding a graphite article to another article. Even though the combination of aluminum and the metal carbide interfacial layer serves to enhance the oxidation resistance characteristics of the graphite article, the resistance to wear of the graphite article is not as great as desired.

In spite of the advances of prior art techniques as described previously for attempting to eliminate the problems of corrosion and wear in graphite articles, there still is a need for improvements in the corrosion and wear resistance characteristics of graphite articles, particularly when those articles are brought into contact with a flow of fluids at elevated temperatures in the presence of air.

SUMMARY OF THE INVENTION

The present invention provides a new and improved technique for the production of corrosion and wear resistant graphite articles wherein the articles can be rendered substantially resistant to both corrosion, in the form of oxidation, and wear created by the flow of elevated temperature fluids. In the preferred embodiment of the invention, the surface of a graphite article is converted to silicon carbide and then is treated with aluminum phosphate, infiltrated into both the carbonaceous substrate and the silicon carbide overcoat, to form a corrosion and wear resistant stratum which protects the pure carbon inner core of the graphite article at greatly elevated temperatures for sustained periods of time. The mechanism by which the invention functions is not known for certain. The extremely hard silicon carbide which forms the exposed surface is extremely resistant to the effects of fluid erosion, while the carbonaceous interior of the article is protected from attack.

Treated graphite articles according to the invention are produced by machining commercially available extruded or molded graphite material into a desired article shape. After heating the article, silicon carbide is formed on the surface of the article by contact with gaseous chemicals such as alkylchlorosilanes and hydrogen. The combined gases react with the surface of the article and provide a high quality silicon carbide layer. Temperatures on the order of 1150°–1250° C. have been found suitable for forming zones of silicon carbide.

Subsequent to the formation of the silicon carbide zones, the graphite articles are heated at low temperature for an extended period of time in order to drive off all moisture. These articles are placed in a chamber evacuated to about 27-30 inches of water. The vacuum is maintained for about three hours at room temperature.

While maintaining the vacuum, aluminum phosphate ($ALPO_4$) in an acid solution is introduced into the chamber until the articles are covered. The chamber is pressurized to about 90 psig for about three hours. Thereafter, the solution is drained and the articles are heated in an autoclave for an extended period of time at atmospheric pressure at about 400° C. After removal from the autoclave and cooling to room temperature, the articles are ready for use.

Graphite articles subjected to the treatment according to the invention are adaptable in particular to molten metal pumps used in the metal casting industry such as those disclosed in the Shot Pump Patent. Other applications include parts of various equipment exposed to the flow of molten metals, as well as those objects exposed to the flow of other elevated temperature gases and liquids such as, for example, jet engine parts and sub-assemblies. The treatment process can be utilized on a broad range of various graphite articles and is not confined to articles which are composed only of those carbons whose coefficient of thermal expansion is the same in all directions and closely matches the thermal expansion coefficient of silicon carbide. No thermal shock problems, such as surface cracking or flaking, have been observed with the articles treated with the process. Tests have indicated that, in comparison to untreated graphite articles, the impregnation of aluminum phosphate increases corrosion and wear resistance by about four times. When silicon carbide-treated graphite articles were tested in air at about 760° C. for 24 hours, the corrosion and wear resistance was increased only by about 1.5 times over untreated graphite. When articles produced in accordance with the invention were tested, however, the corrosion and wear resistance of the articles was increased by more than 20 times over untreated graphite, a most unusual and unexpected result.

The foregoing and other features and advantages, and a thorough understanding of the invention, may be had by referring to the following description and claims, taken in conjunction with the accompanying drawings.

BRIEF DESCRIPTION OF THE DRAWINGS

FIG. 5 is a photomicrograph of a graphite article, the photograph illustrating the article at a magnification of 100 times;

FIG. 6 is a view similar to FIG. 5, in which the magnification is 700 times;

FIG. 7 is a view of a graphite article treated with silicon carbide, the photograph being taken near the surface of the article and at a magnification of 1,000 times;

FIG. 8 is a photomicrograph of a graphite article treated with aluminum phosphate, the photograph being taken near the surface of the article and at a magnification of 700 times;

FIG. 9 is a photomicrograph of a graphite article treated by a process in accordance with the invention, the photograph having been taken from the outer surface of a sample as indicated in FIG. 4 at a magnification of 700 times;

FIG. 10 is a view similar to FIG. 9, but at a magnification of 1,800 times;

FIGS. 11 and 12 are photomicrographs similar to FIG. 9 taken at a location as indicated in FIG. 4 at a magnification of 700 times; and, FIG. 13 is a photomicrograph similar to FIGS. 9, 11, and 12 taken at a location as indicated in FIG. 4 at a magnification of 700 times.

DESCRIPTION OF THE PREFERRED EMBODIMENT

Figure 1:
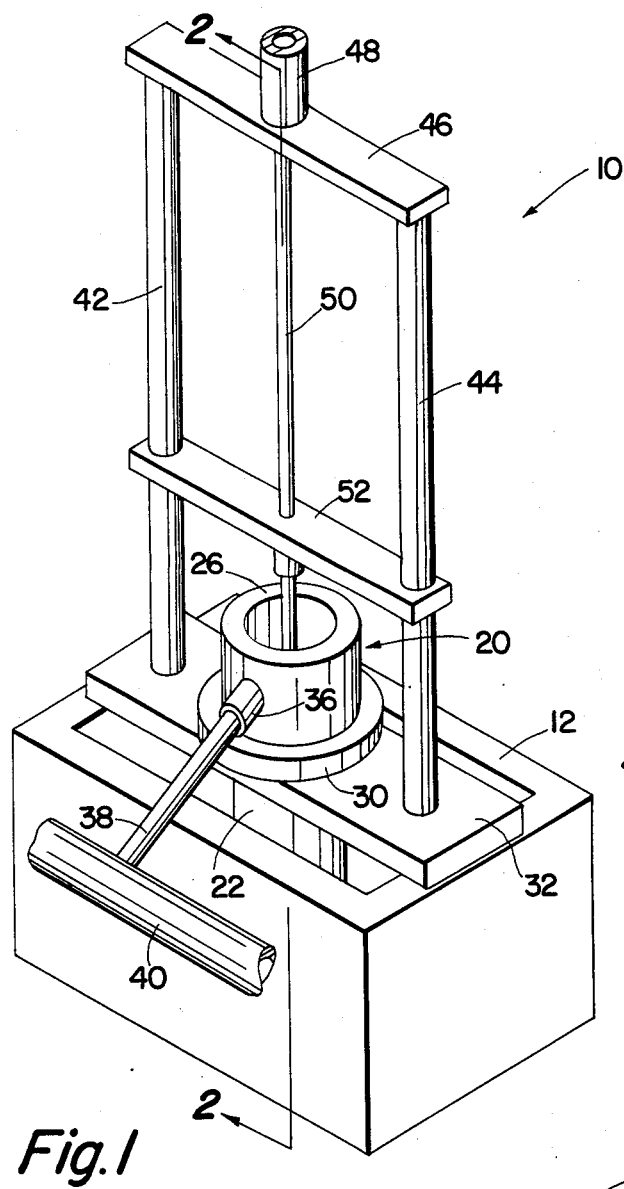
FIG. 1 is a perspective view of a molten metal pump employing graphite parts produced in accordance with the present invention.
Figure 2:
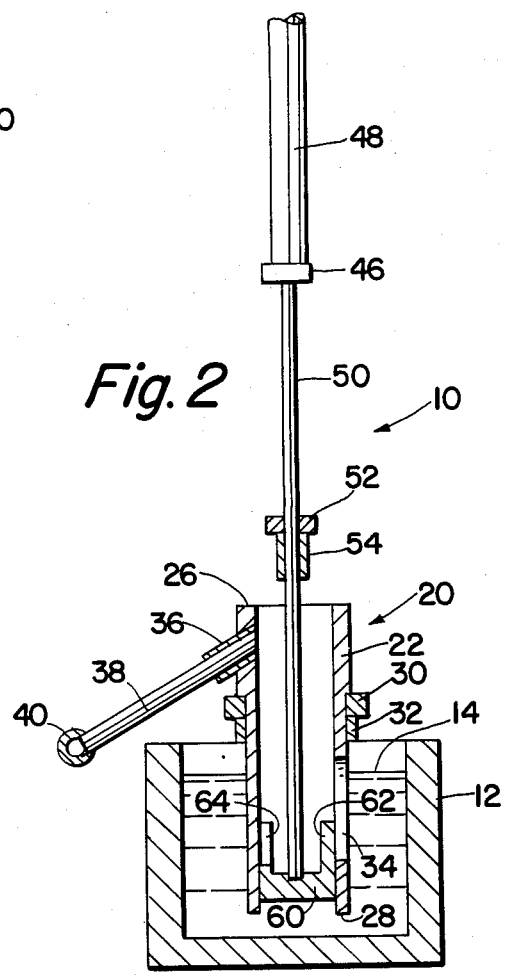
FIG. 2 is a view, partly in cross-section, taken along a plane indicated by line 2—2 in FIG. 1.

Referring to FIGS. 1 and 2, a molten metal pump 10 is shown. The pump 10 is of the type used for transferring quantities of molten aluminum for various purposes. The pump 10 employs some parts formed of graphite treated in accordance with the process according to the invention. The mechanical features of the pump 10 are known in the art and, by themselves, do not form a part of the present invention. Certain of the mechanical features of the pump 10 are described in more detail in U.S. Pat. No. 4,078,706 and the Shot Pump Patent, the disclosures of which are incorporated herein by reference.

The pump 10 includes a bath 12 within which metals such as aluminum may be heated to a molten state and maintained in that condition for subsequent use in a casting process. The upper surface of the molten aluminum is indicated in FIG. 2 by the numeral 14. A molten metal metering and transfer device 20 is shown seated in the bath 12. The device 20 includes an elongate cylinder 22 which forms a cylindrical chamber 24. The cylinder 22 is formed of graphite treated in accordance with the process as described more fully subsequently.

Figure 4:
FIG. 4 is an end elevational view of the sectioned face of the cut away portion of the ring shown in FIG. 3.
Figure 3:
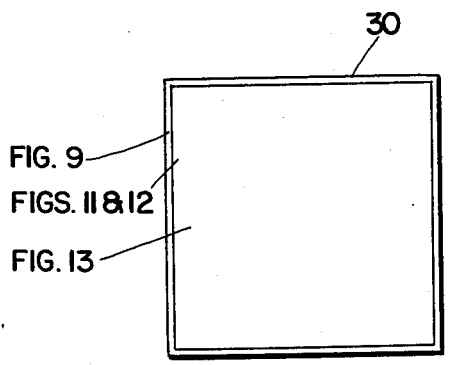
FIG. 3 is a perspective view of a graphite ring produced in accordance with the invention, a portion of the ring being cut away and displaced to one side of the ring.
Figure 3:
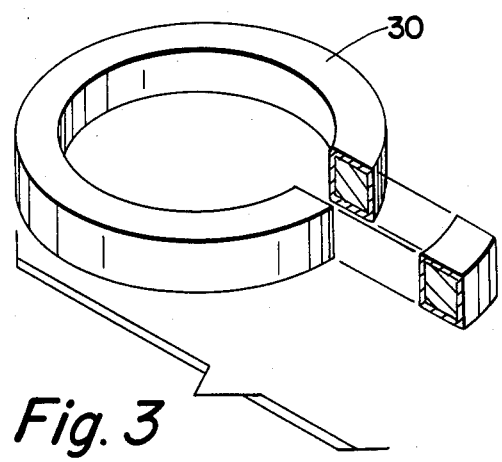

The cylinder 22 has an open top 26 and an open bottom 28, with the bottom 28 extending into the molten metal and the open top 26 extending out of the bath 12. The cylinder 22 is seated in the bath 12 such that the longitudinal axis of the cylinder 22 extends substantially perpendicular to the surface of the molten metal. The upper portion of the cylinder 22 is enlarged to define a shoulder against which a ring 30 is engaged. The ring 30 is illustrated in FIGS. 3 and 4. The ring 30 rests on an apertured support rail 32 which extends across the bath 12 and rests on the upper edges of the side walls forming the bath 12.

An entry port, or aperture 34, is formed in the lower side wall of the cylinder 22 and is shown in FIG. 2. The entry port 34 extends partially below and partially above the surface 14 of the molten metal when the cylinder 22 is seated in the bath 12 so that molten metal from the bath 12 can enter the chamber 24. A refractory tube 36 extends outwardly from the cylinder 22 near the open top 26 to permit molten metal to be discharged from the chamber 24. A conduit 38 connects the exit tube 36 with a so-called shot sleeve 40.

The device 20 also includes vertically extending frame members 42, 44. The frame members 42, 44 are secured at one end to the rail 32 and are secured at the other end to each other by means of a cross bar 46. A hydraulic cylinder 48 extends upwardly from the cross bar 46 and includes a plunger rod 50 extending through an opening (not shown) in the cross bar 46 downwardly into the chamber 22. The plunger rod 50 is guided in its excursion by a brace 52 having apertures through which the members 42, 44 and the plunger rod 50 extend. The brace 52 is secured in position relative to the plunger rod 50 by means of a collar 54 secured to the plunger rod 50 at approximately its midpoint.

A piston, or bucket 60, is connected to the plunger rod 50 at that end of the plunger rod 50 remote from the cylinder 48. The piston 60 is a cup-like structure having an upwardly extending cylindrical wall 62 within which a vertically extending slot 64 is formed. As will be apparent from an examination of FIG. 2, when the piston 60 is lowered to that position shown in FIG. 2, molten metal will be permitted to flow into the piston 60 and will be contained within the wall 62. Metal enters the piston 60 by passing through the entry port 34. Upon raising the piston 60 to an uppermost position by activation of the hydraulic cylinder 48, the slot 64 eventually will be raised to a vertical location adjacent the exit tube 36. Molten metal carried upwardly within the piston 60 then will flow outwardly of the piston through the slot 64 and outwardly of the cylinder 22 into the tube 36, the conduit 38, and the shot sleeve 40.

The cylinder 22, the ring 30, the tube 36, and the piston 60 are formed of graphite treated in accordance with the present invention. Referring now to FIGS. 3-13, a description of the process and articles produced in accordance therewith will be described.

The starting material for preparation of articles according to the invention is commercially available extruded or molded graphite machined as is known in the art to a surface finish about 125 microinch. An acceptable grade of extruded graphite has been sold under the mark HLM by the Great Lakes Carbon Corporation of Niagara Falls, N.Y. The HLM extruded graphite has a coefficient of thermal expansion of $1.8 \times 10^{-6}$ in./in./°F. with the grain, and a coefficient of thermal expansion of $3.15 \times 10^{-6}$ in./in./°F. against the grain. The density is 1.68 gm/cc, and the flexural strength is 2400-4400 psi depending on size of the product.

An acceptable molded graphite material has been marketed by the Stackpole Corporation under the designation 20—20. The material has a coefficient of thermal expansion of $3.2 \times 10^{-6}$ in./in./°F. with the grain, and a coefficient of thermal expansion of $3.8 \times 10^{-6}$ in./in.°F. against the grain. The density is 1.77 gm/cc, and the flexural strength is 5500 psi with the grain, and 4800 psi against the grain.

After the graphite has been machined to the desired shape and surface finish, it is ready for the formation of a silicon carbide zone. The exact technique by which the silicon carbide zone is formed is thought to be important to optimum implementation of the invention. The chemical vapor deposition technique described in French Pat. No. 1,388,539 is carried out and is continued until the silicon carbide zone extends to a depth within the range of 0.035-0.045 inch. Subsequent to the formation of the silicon carbide zone, the articles are allowed to cool to room temperature.

The articles thus treated are impregnated with aluminum phosphate ($AlPO_4$) as follows:

1. The articles are dried in a heated environment for approximately eight hours at about 105° C.
2. The articles are loaded in a container and placed in a chamber.
3. The chamber is evacuated to about 27-30 inches of water.
4. The vacuum is maintained for about three hours at room temperature.
5. While maintaining the vacuum, a solution containing aluminum phosphate is introduced into the chamber until the articles are covered. The solution is prepared by dissolving pure aluminum in hydrochloric and monobasic phosphoric acids to obtain a specific gravity of $1.2 \pm 0.16$ grams/cc.
6. The chamber is pressurized to about 90 psig for about three hours.
7. The aluminum phosphate solution is drained from the chamber.
8. The articles are left in the chamber for approximately two to three hours to completely drain any excess solution.
9. The container within which the articles are disposed is removed from the chamber and placed in an autoclave.
10. The articles are heated in the autoclave from room temperature to about 400° C. over the course of about eight hours at atmospheric pressure. Volatiles in the aluminum phosphate solution are driven off, leaving behind substantially pure aluminum phosphate distributed throughout.
11. Once the autoclave attains approximately 400° C., that temperature is maintained for another three hours.
12. The autoclave is opened and the articles are permitted to cool to room temperature.
13. After attaining room temperature, the articles are ready for use in high temperature environments.

Oxidation tests have been conducted on treated HLM grade extruded graphite. The graphite was machined to a cylinder three inches long by three inches outside diameter by two inches inside diameter. The tests were conducted by heating the cylinder at an elevated temperature in the presence of air for 24 hours and measuring the weight loss as an indication of oxidation. The test results are summarized below:

TABLE 1

| | OXIDATION TESTS | | |
|---|---|---|---|
| Test Temperature (°C.) | Time of Test (Hours) | Material Treatment | Percent Oxidation |
| 760 | 24 | Graphite + $AlPO_4$ | 31 |
| 790 | 24 | Graphite + Silicon Carbide | 28 |
| 790 | 24 | Graphite + Silicon Carbide + $AlPO_4$ | 10 |

Additional tests in molten aluminum were conducted using actual pumps as described earlier. The cylinder 22 and the bucket 60 were composed essentially of graphite and specially processed graphite and were tested until destroyed by oxidation and wear which made the pumps inoperable. Several pumps were assembled and tested in molten aluminum to verify life and method of material failure. The pumps were operated continuously until failture. Actual testing consisted of lifting metal upwardly in measured weights and pouring the metal into a trough to be recycled for further use. The test results are summarized below in Table 2:

TABLE 2
SERVICE TESTS

| No. of Tests | Material | Failure | Life Hours | Cycles |
|---|---|---|---|---|
| 1 | Graphite, HLM extruded | oxidation | 70 | 1,100 |
| 1 | Graphite impregnated once with aluminum phosphate | oxidation | 150 | 4,730 |
| 1 | Graphite impregnated twice with aluminum phosphate | wear and oxidation | 168 | 7,600 |
| 1 | Graphite impregnated with aluminum phosphate then reacted to form .015 in. SiC zone | oxidation, SiC zone discontinuous | 168 | 15,000 |
| 2 | Graphite reacted to form .035 ± .005 in. SiC zone, then impregnated with aluminum phosphate | oxidation | 600 | 50,000 |

Table 2 lists tests of metering pumps to determine their longevity in molten aluminum at 680±25° C. The data in Table 2 compare various forms of graphite. The processed material according to the invention protected the surface of soft graphite with a hard adhered porous silicon carbide refractory and impregnated such material with a high temperature impregnant such as aluminum phosphate. The aluminum phosphate had a specific graphity of 1.20±0.15 grams/cc at 25° C.

The tests of metering pumps clearly demonstrated that using untreated commercial graphite in constructing metering pumps resulted in short life which rendered the pumps non-commercial as shown in Table 2. However, materials according to the invention have made it possible to construct essential parts of high temperature pumps and extend the life of these pumps several hundred hours to become commercial products. Although the mechanism of reducing oxidation was not fully understood, the effect in reducing oxidation at 600°-800° C. of composite graphite appears to be related to the protection of graphite with a more inert and stable refractory, the inclusion of oxidation retardant compounds, and reducing the surface area for oxygen penetration through silicon carbide.

FIGS. 3-13 illustrate in more detail the structure of articles produced in accordance with the invention. The border about the periphery of the sectioned piece in FIGS. 3 and 4 indicates the depth to which the silicon carbide layer extends, approximately 0.035 inch to 0.045 inch.

FIG. 5 is a photomicrograph of an untreated graphite article at a magnification of 100 times. The structure is quite porous. Numerous openings can be seen, representative ones being identified by the reference numeral 60. FIG. 6 is a view similar to FIG. 5, in which the magnification has been increased to 700 times.

FIG. 7 is a view of a graphite article treated only with silicon carbide, the photograph being taken near the surface of the article and at a magnification of 1,000 times. The silicon carbide appears as a shale-like formation, representative ones being identified by the reference numeral 62. In comparison to the article of FIGS. 5 and 6, the porosity is considerably reduced, although it is by no means a porosity-free structure.

FIG. 8 is a photomicrograph of a graphite article treated only with aluminum phosphate, the photograph being taken near the surface of the article at a magnification of 700 times. The porosity of the graphite is not appreciably affected as indicated by the openings 60. Particles of aluminum phosphate appear as the light-colored, generally oval structures indicated by the reference numerals 64. The particles 64 appear to be uniformly distributed throughout the graphite substrate.

FIG. 9 is a photomicrograph of a graphite article treated by a process in accordance with the invention, the photograph having been taken from the other surface of a sample as indicated in FIG. 4 at a magnification of 700 times. In a manner similar to the sample of FIG. 7, the product appears to have relatively few porous openings 60. The silicon carbide formations 62 appear to have been uniformly formed in zones to protect the graphite, and the aluminum phosphate particles 64 apparently are randomly dispersed. FIG. 10 is a view similar to FIG. 9, but at a magnification of 1,800 times. Again, the particles of aluminum phosphate 64 appear to be randomly distributed. The shale-like formations 62 at the upper left and lower left of the FIGURE appear to be silicon carbide.

FIGS. 11 and 12 are photomicrographs similar to FIG. 9 taken at a location as indicated in FIG. 4 at a magnification of 700 times. The porosity is greater than near the surface, although some shale-like formations 62 indicative of silicon carbide interlocked with graphite can be seen. Again, particles of aluminum phosphate 64 appear to be randomly distributed throughout the structure.

FIG. 13 is a photomicrograph similar to FIGS. 9, 11, and 12 taken at a location indicated in FIG. 4 at a magnification of 700 times. A comparison of FIG. 13 with FIG. 8 indicates many similarities. Apparently, the silicon carbide zone has not penetrated to beyond a depth of about 0.040 in., and yet the aluminum phosphate particles 64 still appear to be randomly distributed within the graphite.

Based on the foreoing FIGURES, it seems apparent that the aluminum phosphate particles 64 do not function to completely seal the apparently porous silicon carbide layer. Nevertheless, the number of openings 60 is thought to be reduced somewhat due to the presence of the aluminum phosphate particles 64. In addition, it is thought that the aluminum phosphate particles 64 may act as a "getter," leaving the graphite substrate unoxidized. Regardless of the exact mechanism by which the graphite articles withstand attack in an oxidizing and/or erosion environment, the articles stand up exceedingly well compared with previous graphite articles, as has been indicated.

Although the invention in its preferred embodiment has been described with a certain degree of particularity, it will be appreciated that various changes and modifications can be made. Accordingly, it is intended that the patent shall cover, by suitable expression in the appended claims, all such changes and modifications that fall within the true spirit and scope of the invention. It also is intended that the patent shall cover all features of patentable novelty which exist in the invention disclosed.

What is claimed is:

1. A process for the manufacture of carbonaceous articles having enhanced oxidation-resistance and erosion-resistance characteristics, comprising the steps of:
   (a) forming a carbonaceous article into a desired shape having a desired surface finish:
   (b) forming a layer of silicon carbide at the surface of the article; and (c) impregnating the silicon carbide-coated article with aluminum phosphate, the aluminum phosphate being distributed through the silicon carbide layer and into at least a portion of the carbonaceous article.

2. The process of claim 1, wherein the layer of silicon carbide is formed by a chemical vapor reaction technique.

3. The process of claim 1, wherein the surface layer of silicon carbide extends inwardly from the surface of the article to a depth within range of 0.035–0.045 inch.

4. The process of claim 1, wherein the impregnation with aluminum phosphate is carried out at room temperature and at a pressure of about 90 psig.

5. The process of claim 1, wherein the step of impregnating the article with aluminum phosphate includes:
   (a) drying the article to drive off volatiles;
   (b) applying a vacuum to the article to complete the elimination of volatiles;
   (c) immersing the article in a solution containing aluminum phosphate;
   (d) pressurizing the article;
   (e) draining excess solution from the article;
   (f) heating the article; and,
   (g) permitting the article to cool to room temperature.

6. The process of claim 5, wherein the step of drying includes drying the article for approximately eight hours at a temperature of about 105° Centigrade.

7. The process of claim 5, wherein the step of applying a vacuum to the article includes placing the article under a vacuum of approximately 27–30 inches of water for a period of about three hours while maintaining room temperature.

8. The process of claim 5, wherein the step of pressurizing the article includes pressurizing the article to approximately 90 psig and maintaining that pressure for about three hours.

9. The process of claim 5, wherein the step of heating the article includes heating the article from room temperature to approximately 400° Centigrade within a period of approximately eight hours at atmospheric pressure.

10. The process of claim 9, wherein the step of heating the article includes maintaining the article at approximately 400° Centigrade for about three hours.

11. An article produced by the process according to either of claims 1 or 5.

* * * * *